(12) United States Patent
Pasumansky et al.

(10) Patent No.: US 7,689,703 B2
(45) Date of Patent: Mar. 30, 2010

(54) SYSTEMS AND METHODS OF UTILIZING AND EXPANDING STANDARD PROTOCOL

(75) Inventors: Mosha Pasumansky, Redmond, WA (US); Marius Dumitru, Issaquah, WA (US); Adrian Dumitrascu, Bellevue, WA (US); Cristian Petculescu, Redmond, WA (US); Akshai M. Mirchandani, Redmond, WA (US); Paul J. Sanders, Seattle, WA (US); Thulusalamatom Krishnamurthi Anand, Redmond, WA (US); Richard R. Tkachuk, Sammamish, WA (US); Raman S. Iyer, Redmond, WA (US); Thomas P. Conlon, Redmond, WA (US); Alexander Berger, Sammamish, WA (US); Sergei Gringauze, Redmond, WA (US); Ioan Bogdan Crivat, Redmond, WA (US); C. James MacLennan, Redmond, WA (US); Rong J. Guan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1031 days.

(21) Appl. No.: 11/069,342

(22) Filed: Mar. 1, 2005

(65) Prior Publication Data
US 2006/0026167 A1    Feb. 2, 2006

Related U.S. Application Data

(60) Provisional application No. 60/586,605, filed on Jul. 9, 2004.

(51) Int. Cl.
*G06F 15/16* (2006.01)
*G06F 17/30* (2006.01)

(52) U.S. Cl. .................................... 709/230; 707/10
(58) Field of Classification Search ................ 709/230; 707/10
See application file for complete search history.

(56) References Cited

OTHER PUBLICATIONS

"XML for Analysis Specification, version 1.1" Microsoft Corp. and Hyperion Solutions Corp, Nov. 2002.*

J. Kangasharju, S. Tarkoma, and K. Raatikainen. Comparing SOAP Performance for Various Encodings, Protocols, and Connections. In Personal Wireless Communications, Lecture Notes in Computer Science 2775, Springer-Verlag, Sep. 2003.*

Ken Henderson, section "Transaction Commands and Syntax" in Chapter 17 of "The Guru's Guide to Transact-SQL", Addison Wesley, 2000.*

(Continued)

*Primary Examiner*—William C Vaughn, Jr.
*Assistant Examiner*—Shirley X Zhang
(74) *Attorney, Agent, or Firm*—Workman Nydegger

(57) ABSTRACT

The subject invention relates to systems and methods that extend the network data access capabilities of mark-up language protocols. In one aspect, a network data transfer system is provided. The system includes a protocol component that employs a computerized mark-up language to facilitate data interactions between network components, whereby the data interactions were previously limited or based on a statement command associated with the markup language. An extension component operates with the protocol component to support the data transactions, where the extension component supplies at least one other command from the statement command to facilitate the data interactions.

19 Claims, 12 Drawing Sheets

OTHER PUBLICATIONS

Tomas restrepo, "Authentication the SSPI way", 2001.*

XML for Analysis Specification Version 1.0. Microsoft Corporation and Hyperion Solutions Corporation. Last Updated Apr. 24, 2001. 107 pages. http://www.xmla.org/download.asp?id=2.

Decision Support Objects. Microsoft Corporation. Last viewed on Jun. 27, 2005. 1 page. http://msdn.microsoft.com/library/default.asp?url=/library/en-us/olapdmpr/prabout_84a4.asp.

DIME Specification Index Page. Microsoft Corporation. Last Viewed on Jun. 27, 2005. 1 page. http://msdn.microsoft.com/library/default.asp?url=/library/en-us/dnglobspec/html/dimeindex.asp.

H.F. Nielsen, et al. Direct Internet Message Encapsulation. Internet Engineering Task Force, Jun. 17, 2002. 24 pages. http://msdn.microsoft.com/library/en-us/dnglobspec/html/draft-nielsen-dime-02.txt.

* cited by examiner

SYSTEMS AND METHODS OF UTILIZING AND EXPANDING STANDARD PROTOCOL

RELATED APPLICATION

This application claims priority to U.S. Provisional Patent Application Ser. No. 60/586,605 filed on, Jul. 9, 2004 and entitled SYSTEMS AND METHODS OF UTILIZING AND EXPANDING STANDARD PROTOCOL, the entire contents of which are herein incorporated by reference.

TECHNICAL FIELD

The subject invention relates generally to computer systems, and more particularly, relates to systems and methods that facilitate database access between clients and servers by extending capabilities of analysis services and related protocols.

BACKGROUND OF THE INVENTION

Communications XML for Analysis is a Simple Object Access Protocol (SOAP)-based XML API, designed for standardizing data access interaction between a client application and a data provider working over the Web. Currently, under traditional data access techniques such as OLE DB and ODBC, a client component that is tightly coupled to a data provider server must be installed on the client machine in order for an application to be able to access data from the data provider. Tightly coupled client components, however, can create dependencies on a specific hardware platform, a specific operating system, a specific interface model, a specific programming language, and a specific match between versions of client and server components.

The requirement to install client components and the dependencies associated with tightly coupled architectures are unsuitable for the loosely coupled, stateless, cross-platform, and language independent environment of the Internet. To provide reliable data access to Web applications, the Internet, mobile devices, and cross-platform desktops, a standard methodology is required that does not require component downloads to the client. One possibility involves the Extensible Markup Language (XML) which is generic and can be universally accessed. Thus, instead of invoking a proprietary interface of a client component, it would be desirable for developers to call methods and transfer data through XML HTTP messages without any client components. It would also be desirable if the application developer could build client components without concern for tight coupling to a server component or application. Also, an application developed with any programming language and running on any platform, should be able to access data from any place on the Web without having to plan for specific platform support or even a specific provider version. One such vehicle for these and other network data access goals is provided by a protocol known as the Extensible Markup Language for Analysis or XMLA.

The protocol XML for Analysis advances the concepts of OLE DB by providing standardized universal data access to a standard data source residing over the Web without the need to deploy a client component that exposes Component Object Model (COM) interfaces. Additionally, XML for Analysis is optimized for the Web by minimizing roundtrips to the server and targeting stateless client requests to maximize the scalability and robustness of a data source. Much of the protocol with XMLA is related to two methods, Discover and Execute, which consume and send XML for stateless data discovery and manipulation.

Generally, XMLA protocol is built upon the open Internet standards of HTTP, XML, and SOAP, and is not bound to any specific language or technology. The specification references OLE DB so that application developers already familiar with OLE DB can easily determine how XML for Analysis can be mapped and implemented. Even though XMLA provides many advantages over previous architectures, there are still many applications that are not adequately covered by this protocol. These include current implementations of the Execute method as well as many features such as object design, parameter specifications, binary manipulations, and employment of other network protocols than HTTP, for example.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods that extend the functionality of network data access protocols. In one aspect, a markup language (e.g., XMLA) is extended by adding commands to an Execute method for managing server objects. These commands include Create, Alter, Delete, Process and so forth among a plurality of other commands. In addition, a Discover type is added for discovering the state of objects on the server, wherein various properties can also be added to further extend server object management capabilities. Object specifications and structures are provided for the Create and Alter commands that enable a sender to send an object description of the object that is to be created or altered. This description is returned to a client when it uses a Discover method, for example. The object description includes a set of major objects, many of which have one or more minor objects contained within them.

In another aspect, various parametric operations can be added as extensions to a language. For example, XMLA defines one XML element for sending command text known as the element to a data provider. The subject invention extends the element by allowing it to be parameterized and allowing the parameters to be sent within the same message as the statement itself, if desired. According to another aspect, XMLA extensions for row set parameters describe how database row sets should be represented at the transport level of communication between an Analysis Services server and various clients. Row sets, as query parameters, empower developers of embedded Data Mining applications to use data that is not included in a relational data source, during training and predictions, for example.

Other protocol extensions and enhancements include the employment of TCP/IP network protocol bindings in addition to conventional HTTP bindings to communicate between network systems. Moreover, binary XML mappings can also be provided to enable efficient conversions of data types between systems (e.g., SQL language on a database server mapped to XML style language on a client type system and vice versa).

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

DETAILED DESCRIPTION OF THE INVENTION

The subject invention relates to systems and methods that extend the network data access capabilities of mark-up language protocols. In one aspect, a network data transfer system is provided. The system includes a protocol component that employs a computerized mark-up language to facilitate data interactions between network components, whereby the data interactions were previously limited or based on a statement command associated with the markup language. An extension component operates with the protocol component to support the data transactions, where the extension component supplies at least one other command from the statement command to facilitate the data interactions. The extensions include create commands, alter commands, delete commands, and so forth along with new discovery command capabilities. The extensions further include a parameter specification component for the statement command, a row set component for the statement command, a binary markup language extension for communications, and/or a protocol binding extension to support TCP/IP transactions.

As used in this application, the terms "component," "protocol," "system," "object," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
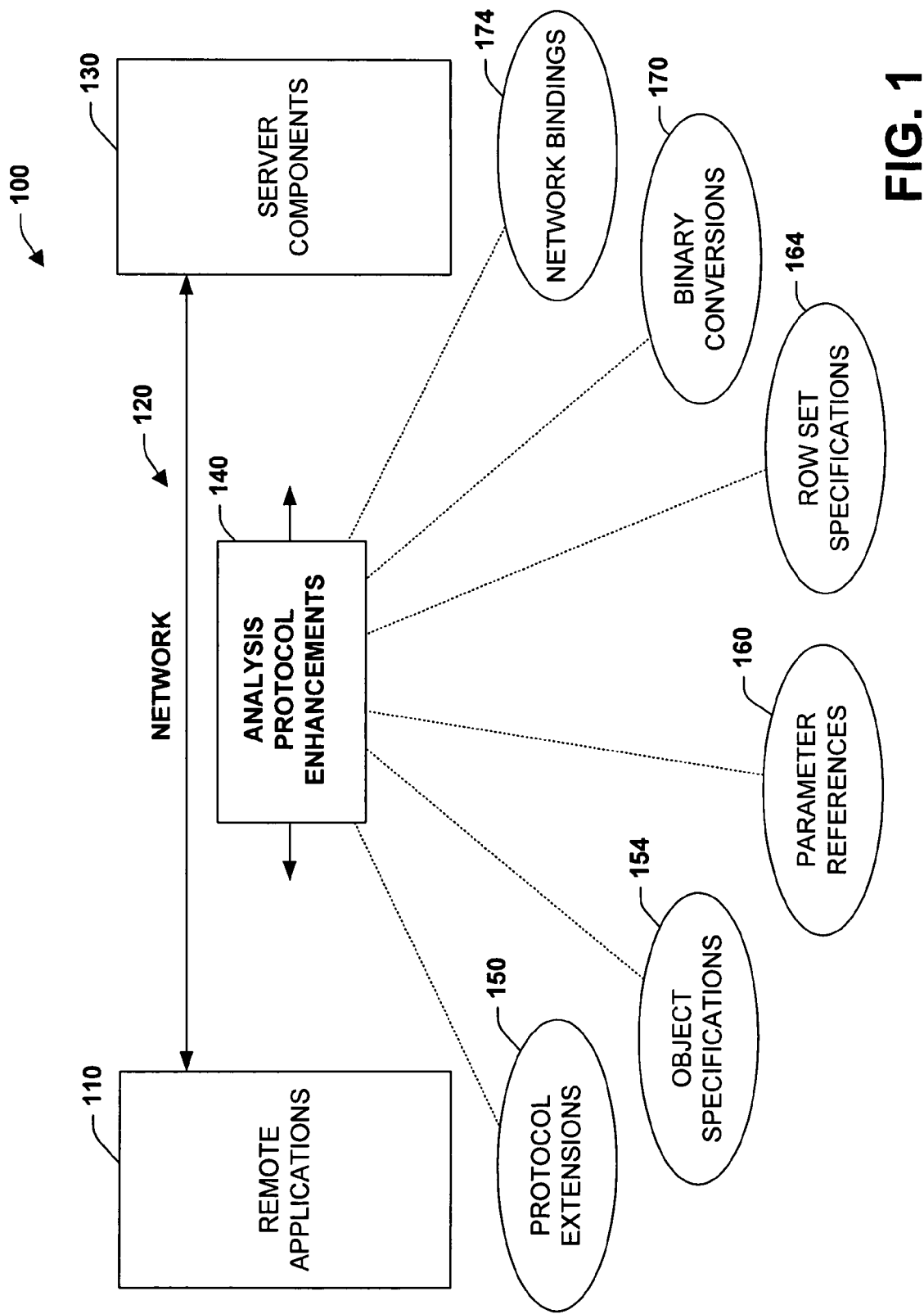
FIG. 1 is a schematic block diagram illustrating a network data transfer system in accordance with an aspect of the subject invention.

Referring initially to FIG. 1, a network data transfer system 100 is illustrated in accordance with an aspect of the subject invention. The system 100 includes a remote application 110 or applications that communicate over a network 120 (e.g., Internet) to one or more remote server components 130 (e.g., OLAP data servers, Analysis Server). An analysis protocol component 140 includes one or more protocol enhancements that facilitate data communications over conventional analysis protocols. For instance, a base analysis protocol for communications can include an Extensible Markup Language for Analysis (XMLA), where the protocol component 140 extends the capabilities of the base protocol in various manners which are described in more detail below. It is to be appreciated however, that other markup languages can be extended in accordance with the subject invention (e.g., Wireless Markup Languages (WML)).

The analysis protocol enhancements 140 include various options such as command protocol and property extensions illustrated at 150. For instance, XMLA can be extended where commands such as Discover and Execute methods are added to the base protocol along with extended property enhancements. At 154, object descriptions and structure is provided to describe data transactions and interfaces between to the remote applications 110 and server components 130. At 160, protocol enhancements 140 include allowing the base protocol to be parameterized and allowing the parameters to be sent with the same message as the statement itself, if desired. Similarly, at 164 row set parameter extend base languages by describing how database row sets should be represented at the transport level of communication between the server components 130 and the remote applications 110. Other enhancements 160 include mappings between network components at 170 (e.g., binary to XML mappings) along with enhanced network binding functionality at 174 (e.g., TCP/IP bindings over and above conventional HTTP bindings). The protocol enhancements 140 are now described in more detail below with respect to FIGS. 2-9.

Figure 2:
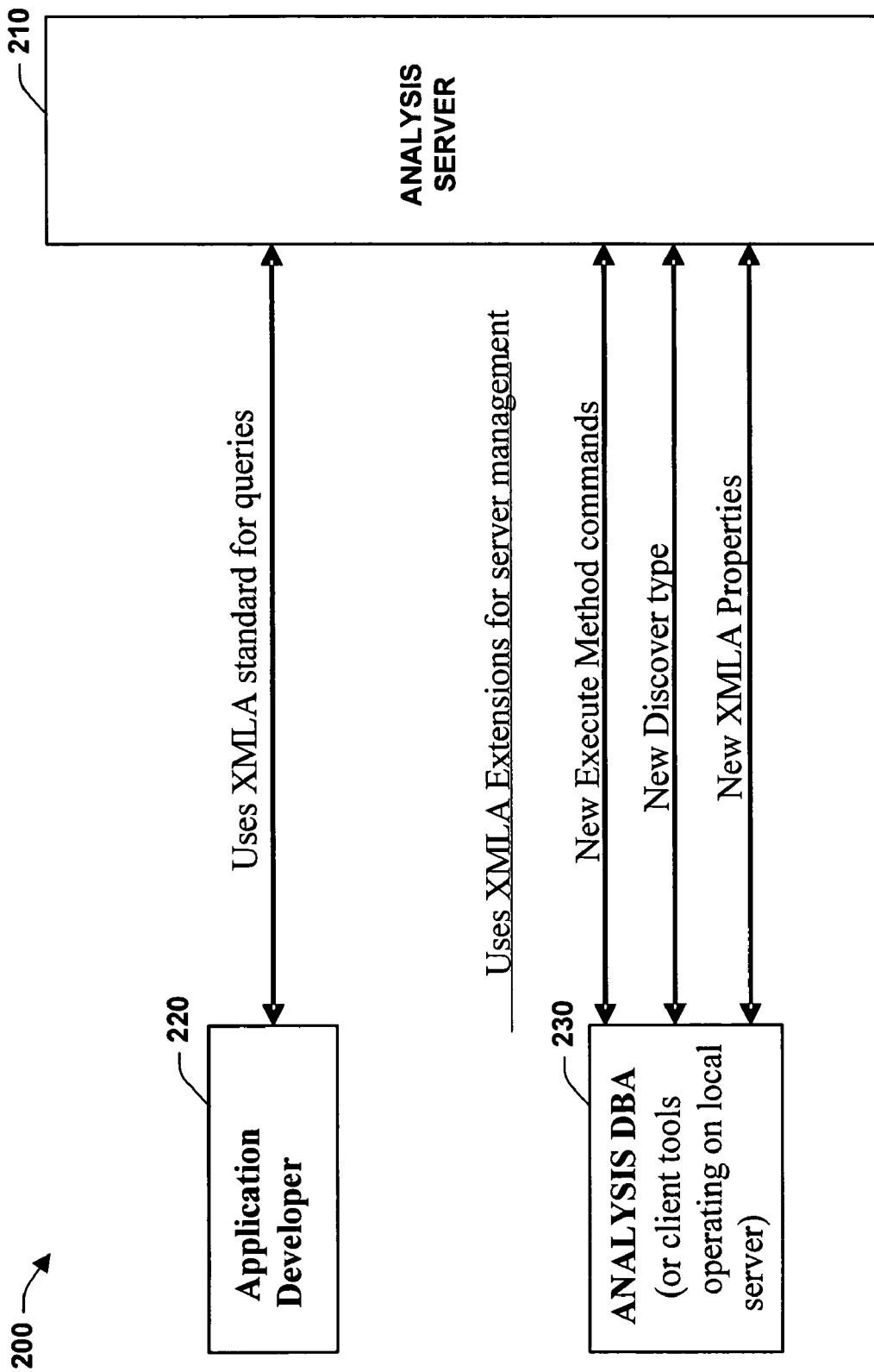
FIG. 2 is a block diagram illustrating an exemplary network system employing extended network protocols in accordance with an aspect of the subject invention.

Referring now to FIG. 2, an exemplary network system 200 that employs extended XMLA protocols is illustrated in accordance with an aspect of the subject invention. An Analysis Server 210 (e.g., On Line Analytical Server) communicates with an Application Developer 220 using an XMLA standard command for queries and other requests. In addition, the Server 210 employs XMLA Extensions for server management. The Server 210 communicates with an Analysis DBA 230 (Database Administrator) or with client tools operating on a local server. This communication also utilizes extended Discover type commands, XMLA properties, and Execute Method commands as described below.

As noted above, XML for Analysis (XMLA) is an open standard for communication between a client application and an analytical server. The XMLA specification generally defines one command for the Execute method. This command is the <Statement> command. In the statement, an element is sent a query statement to retrieve data from the provider. According to the subject invention, XMLA can be extended for various applications. In one aspect, new commands are added to the Execute method for managing server objects and a Discover type is added for discovering the state of objects on the server 210. Also, various XMLA properties are added to further extend server object management capabilities.

The XMLA Extensions for server management include commands for the Execute method, and at least one other type of Discover for the Discover method. Many of these commands have options and sub options. These commands relate to both designing OLAP or Data Mining objects on a server and to the management of those objects on an ongoing basis after they are designed. Some of these commands are also used by an end user when manipulating local cubes or local mining models on a client machine.

The following is a listing of extended XMLA properties, extended types of Discover and extended execute method commands: Create (new Execute method command); Alter (new Execute method command); Delete (new Execute method command); Process (new Execute method command); Lock (new Execute method command); Unlock (new Execute method command); BeginTransaction (new Execute method command); CommitTransaction (new Execute method command); RollbackTransaction (new Execute method command); Batch (new Execute method command); Subscribe (new Execute method command); DesignAggregations (new Execute method command); Cancel (new Execute method command); Backup (new Execute method command); Restore (new Execute method command); Parallel (new Execute method command); NotifyTableChange (new Execute method command); MergePartitions (new Execute method command); Synchronize (new Execute method command); DISCOVER_XML_METADATA (new type of Discover); ImpactAnalysis (new XMLA property); ExecutionMode (new XMLA property). Aspects to these commands will be described in more detail below with respect to FIGS. 3 and 4.

Figure 3:
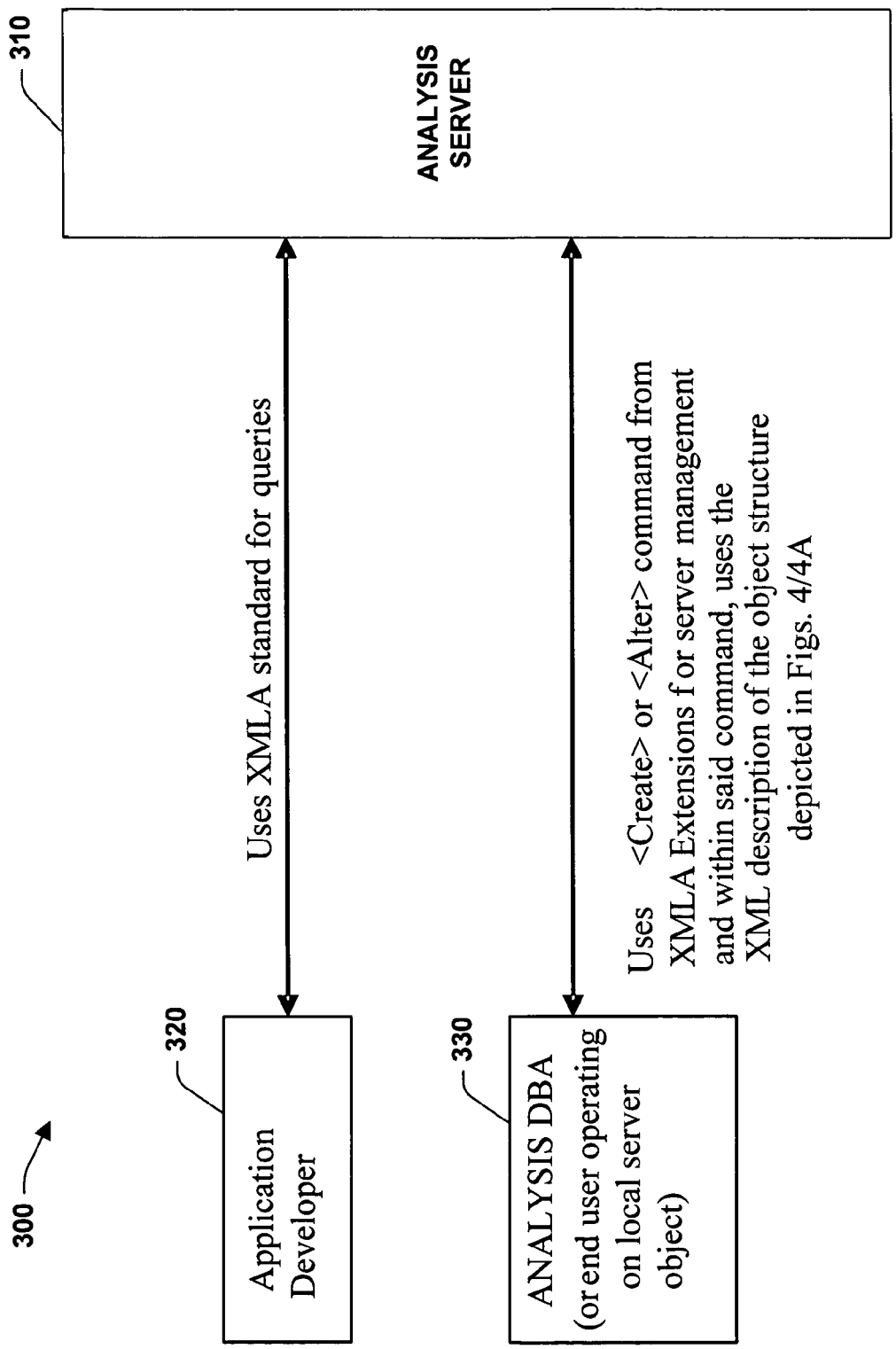
FIG. 3 is a block diagram illustrating an alternative network system employing extended network protocols in accordance with an aspect of the subject invention.
Figure 4:
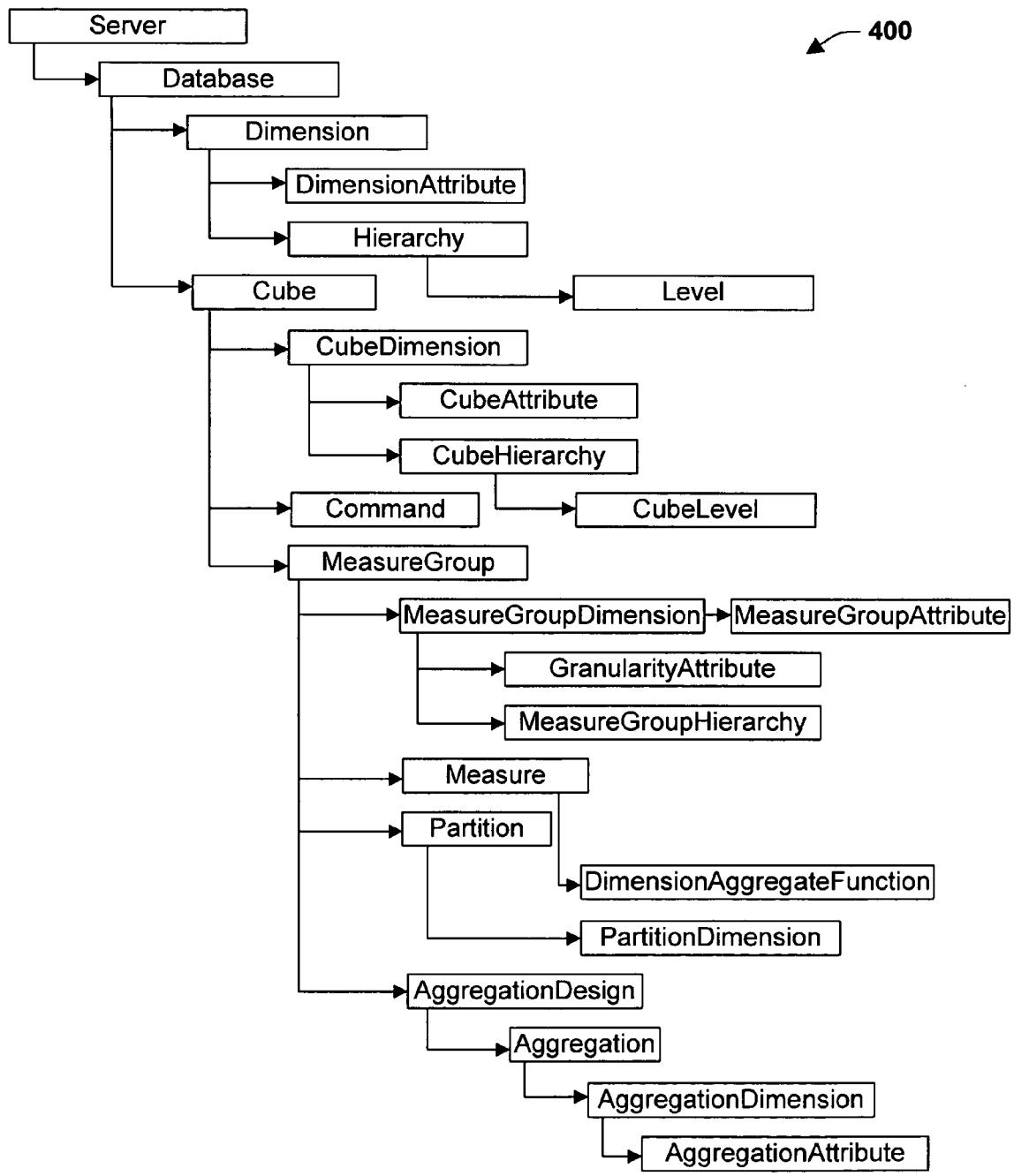
FIGS. 4 and 4a illustrate an example object structure for network data transfers in accordance with an aspect of the subject invention.
Figure 4A:
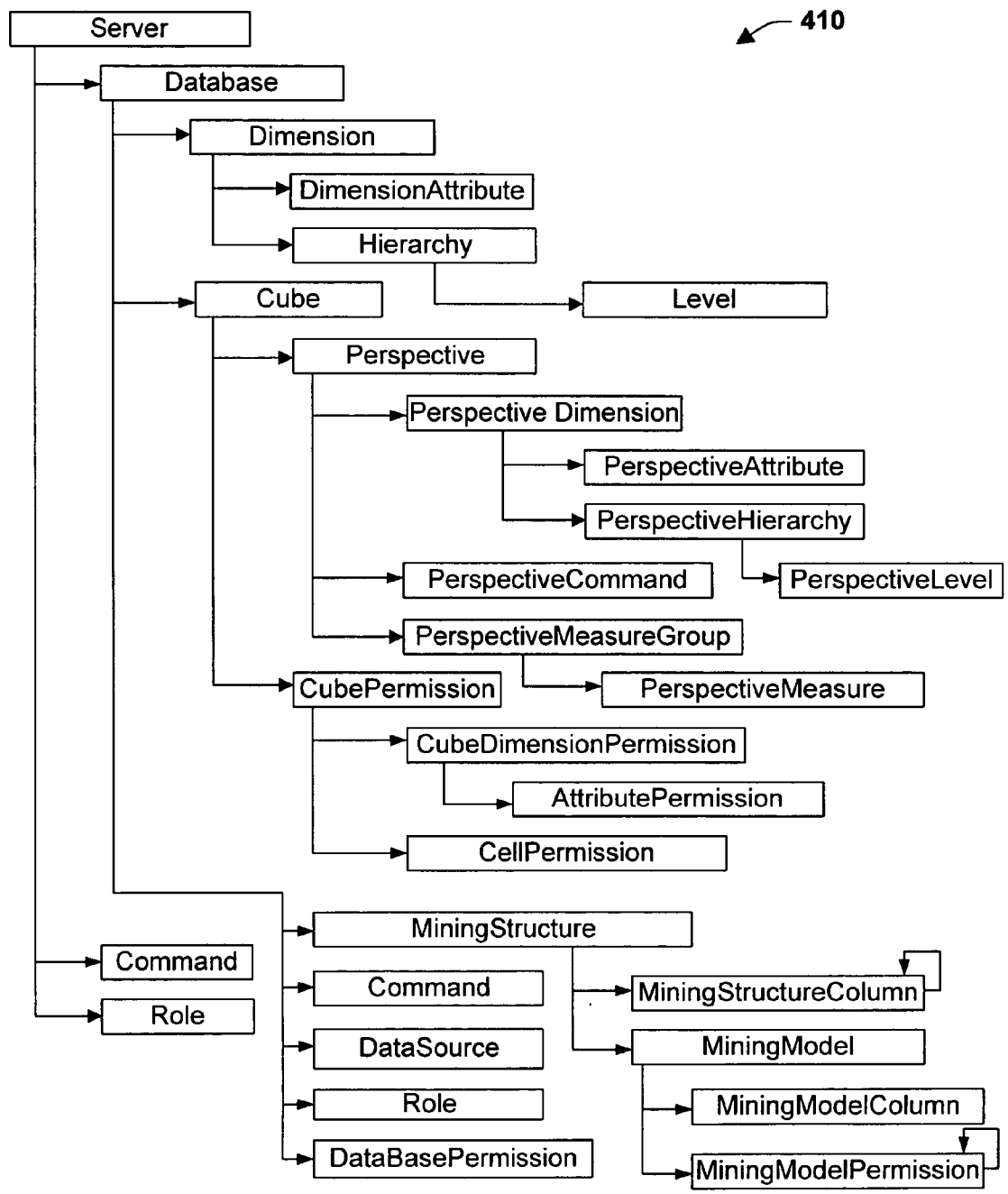

Turning to FIG. 3, an example network system 300 is illustrated in accordance with an aspect of the subject invention. An Analysis Server 310 sends to and receives from an Application Developer 320 via XMLA standard for queries and other data requests. The Server 310 also communicates with an Analysis DBA 330 or other end user operating on a local server object. This link between server and DBA uses <Create> or <Alter> commands from the XMLA extensions for server management described above and within the command employs an XML description of the object as represented in FIGS. 4 and 4a. This object represents an XML based schema for describing OLAP and Data Mining objects on an analytical server. It is the actual description of the OLAP and Data Mining objects that should be sent to the server using the XMLA extensions for server management to instantiate objects, and it is the schema that the server will return to client when the DISCOVER_XML_METADATA Discover call is requested, for example.

The <Create> and <Alter> commands, extensions to the XMLA standard, typically request that the sender send an XML description of the object that is to be created or altered. This XML description is what is returned to a client when it uses the Discover XMLA method, and when it requests the DISCOVER_XML_METADATA Discover. The XML description consists of a set of major objects, many of which have one or more minor objects contained within them and is described in more detail below with respect to FIGS. 4 and 4a. The following example language structures manage the creation and/or altering of the object.

```
object_creation   -><Create AllowOverwrite="True"
UseRemoteSource="false">
    [<ParentObject>object_ref</ParentObject>]
    <ObjectDefinition>
    object_def
    </ObjectDefinition>
     </Create>
    object_altering-><Alter ObjectExpansion=object_expansion
    UseRemotSource="False">
                        <Object>
    object_ref
                        </Object>
    <ObjectDefinition>
    object_def
    </ObjectDefinition>
     </Alter>
    object_ref       ->[ <DatabaseID>database_Id</DatabaseID> ]
    [ <DimensionID>dimension_Id</DimensionID> ]
    [ <CubeID>cube_Id</CubeID> ]
    [ <MeasureGroupID>measureGroup_Id</MeasureGroupID> ]
    [ <PartitionID>partition_Id</PartitionID> ]
    [ <CommandID>command_Id</CommandID> ]
    [ <DataSouceID>DataSource_Id</DataSouceID> ]
    object_def       ->   <Server>...<Server>
                        <Database>...<Database>
                        etc. (as defined in OLAP Object Structure)
```

Generally, references to the object are provided by listing the ID of the object (and of it's ancestors). For example, a reference to a cube can consist of a server, database, and cube ID. It is noted that a server ID may be required, as a message can be sent to one server, modifying objects on another. The objects specified in object_ref are not order dependent. They can be assembled by a processor and put in an implied hierarchical order, if they are not presented that way in the associated data or XML stream.

FIGS. 4 and 4a illustrate an example object structure 400 and 410 for network communications that can be employed with the commands described above in FIGS. 1-3. The following is a list of some of the major objects appearing in the structure 400 and 410: Server; Database; Dimension; Cube; MeasureGoup; Partition; Perspective; AggregationDesign; MiningStructure; MiningModel; DataSource; DataSourceView; Trace; Assembly; MdxScript; Role; DatabasePermission; DimensionPermission; CubePermission; MiningStructurePermission; MiningModelPermission; and DataSourcePermission, for example.

Figure 5:
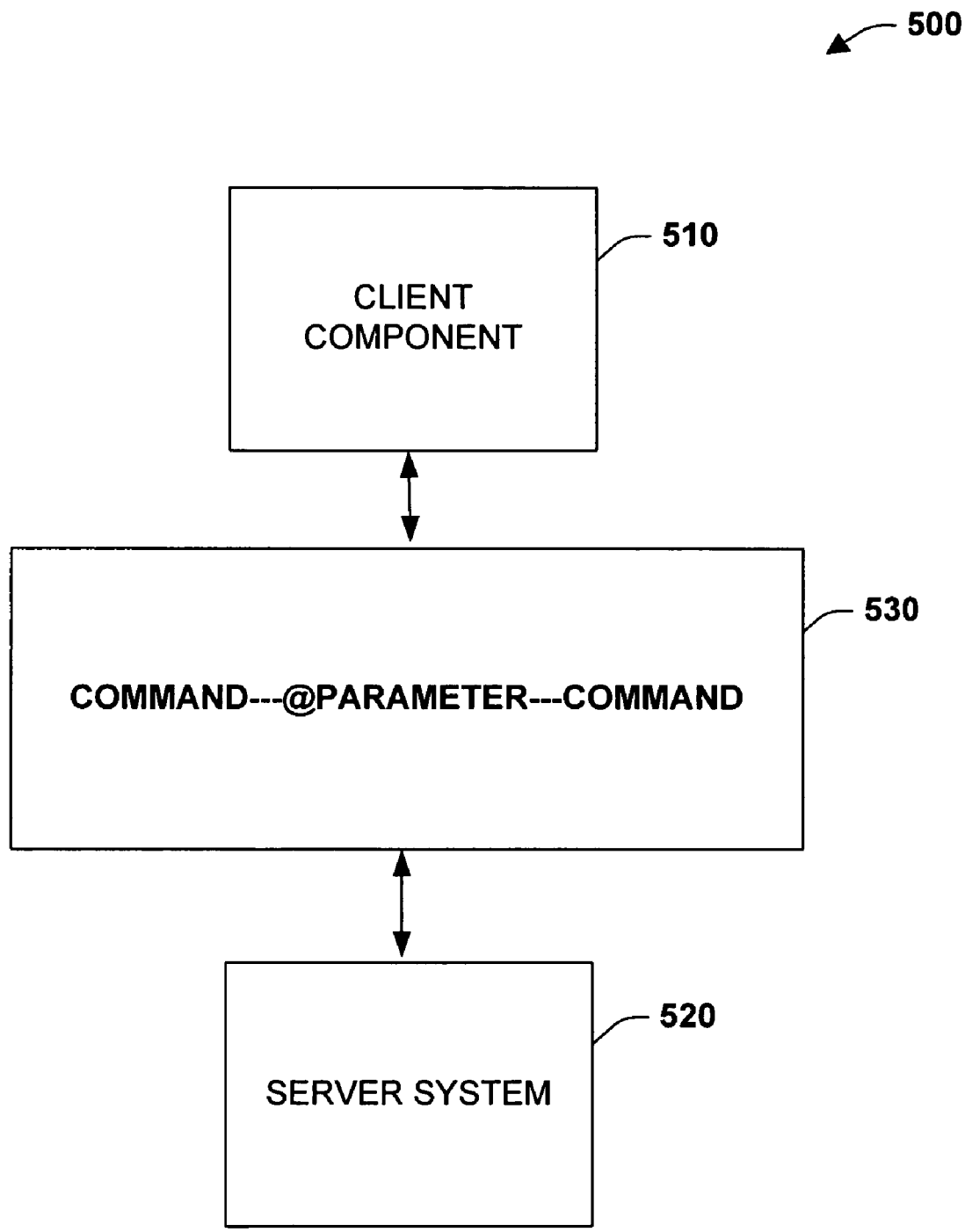
FIG. 5 illustrates an example system for communicating parameter information via XMLA protocol in accordance with an aspect of the subject invention.

FIG. 5 illustrates an example system 500 for communicating parameter information via XMLA protocol. The system 500 includes a client component 510 (or application) that communicates with a server system 520 via a command 530 that employs extended parameter information that can be included within the command. As noted above, an extension to the XML for Analysis (XMLA), open standard protocol. Generally, XMLA defines one XML element for sending command text to the data provider via the <Statement> element. The subject invention extends the <Statement> element by allowing it to be parameterized and allowing the parameters to be sent with the same SOAP message as the statement itself, if desired.

According to one aspect, a provision is made for a reference to a parameter within the Statement element's text at 530, and another parameter is added to the Execute XMLA method. This allows a collection of parameters to be transmitted with the Execute method call. The reference to the parameter within the Statement text is made by using the '@' symbol, for example, (or other symbol) followed by the parameter name, for example '@My_Parameter'. The additional argument to the XMLA Execute method may include a collection of parameters in the form of Name and Value pairs. For instance, the Value element can have its xsi:Type specified with the element. This implies that the type of the Value element is not restricted. Thus, any type supported by the provider can be sent as a parameter, including complex types. The following is an example of a simple XMLA Execute method call, with a single parameter added (in this case, the parameter is of type int):

```
<Envelope xmlns="http://schemas.xmlsoap.org/soap/envelope/">
  <Body>
    <Execute xmlns="urn:schemas-microsoft-com:xml-analysis">
      <Command>
        <Statement>SELECT [Measures].Members WHERE
        [Measures].Sales >
            @My_Parameter </Statement>
      </Command>
      <Properties>
        <PropertyList>
          <DataSourceInfo>local</DataSourceInfo>
        </PropertyList>
      </Properties>
      <Parameters xmlns:xsi="http://www.w3.org/2001/XMLSchema-instance"
xmlns:xsd="http://www.w3.org/2001/XMLSchema">
        <Parameter>
          <Name>My_Parameter</Name>
          <Value xsi:Type="int">1000
          </Value>
        </Parameter>
      </Parameters>
    </Command>
  </Execute>
</Body>
</Envelope>
```

Figure 6:
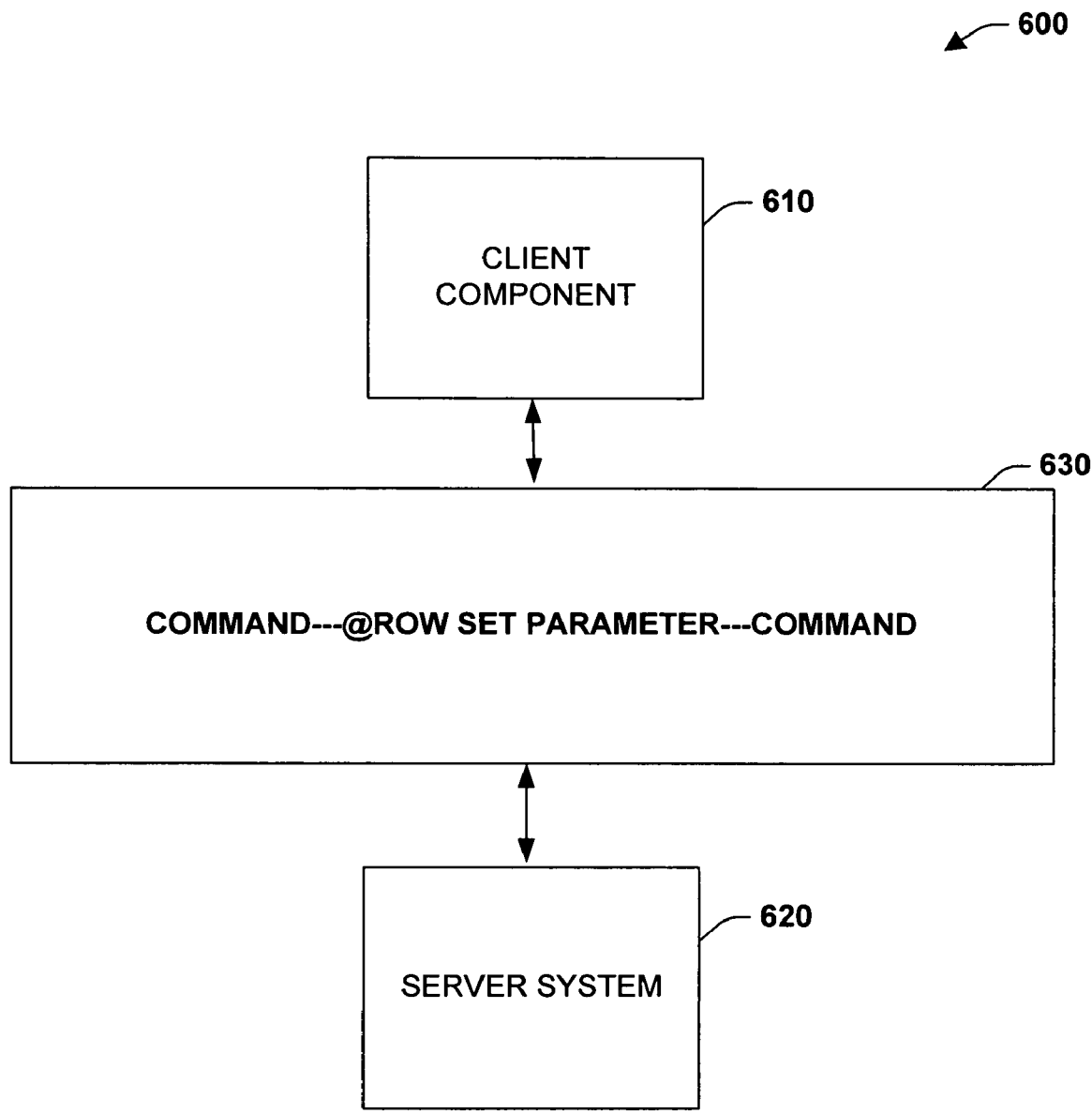
FIG. 6 illustrates an example system for communicating row set parameter information via XMLA protocol in accordance with an aspect of the subject invention.

FIG. 6 illustrates an example system 600 for communicating row set parameter information via XMLA protocol. The system 600 includes a client component 610 that communicates with a server system 620 in accordance with a command 630 that employs extended row set parameter information that can be included within the command. In this aspect, XMLA Extensions for row set parameters is a specification how rowsets that are statement parameters should be represented at the transport level of communication between an Analysis Services server and various clients. Rowsets, as query parameters, empower developers of embedded Data Mining applications to use data that is not included in a relational data source, for example.

The subject invention provides system for representing rowset parameters at the lowest level of communication between an Analysis Services server and the client application. This level of communication is conformant to XML for Analysis (XMLA) and it ensures that various applications can communicate with Analysis Services. Typically, rowsets are represented as parameters using the communication protocol known as XML for Analysis, for example. The rowset parameters, when used with a statement command, follow the XMLA standard for describing parameters. Like other parameters, the rowset parameters can be Name/Value pairs. The Value field of the pair is Value XMLA element and can be qualified with a e.g., "urn:schemas-microsoft-com:xml-analysis:rowset" namespace. The content of the Value XMLA element is the XMLA serialization of the rowset, as described by XMLA standard protocol on result rowsets, with an XSD schema.

If the rowset parameter is used in a Data Mining DMX statement (e.g., INSERT INTO or PREDICTION JOIN), then the binding of the rowset columns is explicit in the syntax of the command. The OLEDB for Data Mining specification available on the Internet contains details on how the columns in a rowset are to be mapped to the columns of a mining model. The binding is generally performed explicitly (based on columns ordinals, as in INSERT INTO statements, or based on explicit linking of columns, as in PREDICTION JOIN statements) or implicitly, based on the columns of the rowset that is sent as a parameter at 630 (the case of the NATURAL PREDICTION JOIN statements). An example of this scheme is as follows:

```
INSERT INTO [Model]
(
SKIP,
[A],
[B]
)
@RowsetParameter
```

The validation of the rowset parameter follows the rules described in the OLEDB for Data mining specification for each statement. The following is a sample XMLA statement with a rowset parameter.

```
<Envelope xmlns="http://schemas.xmlsoap.org/soap/envelope/">
  <Body>
    <Execute xmlns="urn:schemas-microsoft-com:xml-analysis">
      <Command>
        <Statement>INSERT INTO [C2] ([Age], [CustId], [Region], [Orders] (SKIP,
[OrderId], [City], [Address])) @RowsetParameter</Statement>
      </Command>
      <Properties>
        <PropertyList>
          <DataSourceInfo>local</DataSourceInfo>
          <Timeout>0</Timeout>
          <LocaleIdentifier>1033</LocaleIdentifier>
          <Catalog>CheckInTestDB</Catalog>
          <Content>SchemaData</Content>
          <Format>Tabular</Format>
          <DbpropMsmdCacheRatio>0</DbpropMsmdCacheRatio>
          <SQLQueryMode>Calculated</SQLQueryMode>
          <RealTimeOlap>false</RealTimeOlap>
        </PropertyList>
      </Properties>
      <Parameters xmlns:xsi="http://www.w3.org/2001/XMLSchema-instance"
xmlns:xsd="http://www.w3.org/2001/XMLSchema">
        <Parameter>
          <Name>RowsetParameter</Name>
```

-continued

```
            <Value xmlns="urn:schemas-microsoft-com:xml-analysis:rowset"
        xmlns:xsi="http://www.w3.org/2001/XMLSchema-instance"
        xmlns:xsd="http://www.w3.org/2001/XMLSchema">
                <xsd:schema targetNamespace="urn:schemas-microsoft-com:xml-
analysis:rowset" xmlns:sql="urn:schemas-microsoft-com:xml-sql"
elementFormDefault="qualified">
                        <xsd:element name="root">
                            <xsd:complexType>
                                <xsd:sequence minOccurs="0" maxOccurs="unbounded">
                                    <xsd:element name="row" type="row"/>
                                </xsd:sequence>
                            </xsd:complexType>
                        </xsd:element>
                        <xsd:complexType name="row">
                            <xsd:sequence>
                                <xsd:element sql:field="Age" name="Age" type="xsd:double"
        minOccurs="0"/>
                                <xsd:element sql:field="Customer Id"
name="Customer_x0020_Id" type"xsd:int"/>
                                <xsd:element sql:field="Region" name="Region"
type="xsd:string" minOccurs="0"/>
                            </xsd:sequence>
                        </xsd:complexType>
                </xsd:schema>
                <row>
                    <Age>5.E-1</Age>
                    <Customer_x0020_Id>5</Customer_x0020_Id>
                    <Region>WA</Region>
                </row>
                <row>
                    <Age>1.5</Age>
                    <Customer_x0020_Id>6</Customer_x0020_Id>
                    <Region>OR</Region>
                </row>
                <row>
                    <Age>2.5</Age>
                    <Customer_x0020_Id>7</Customer_x0020_Id>
                    <Region>UT</Region>
                </row>
                <row>
                    <Age>1.3</Age>
                    <Customer_x0020_Id>8</Customer_x0020_Id>
                    <Region>ID</Region>
                </row>
            </Value>
        <Parameter>
        </Parameters>
    </Execute>
 </Body>
</Envelope>
```

Figure 7:
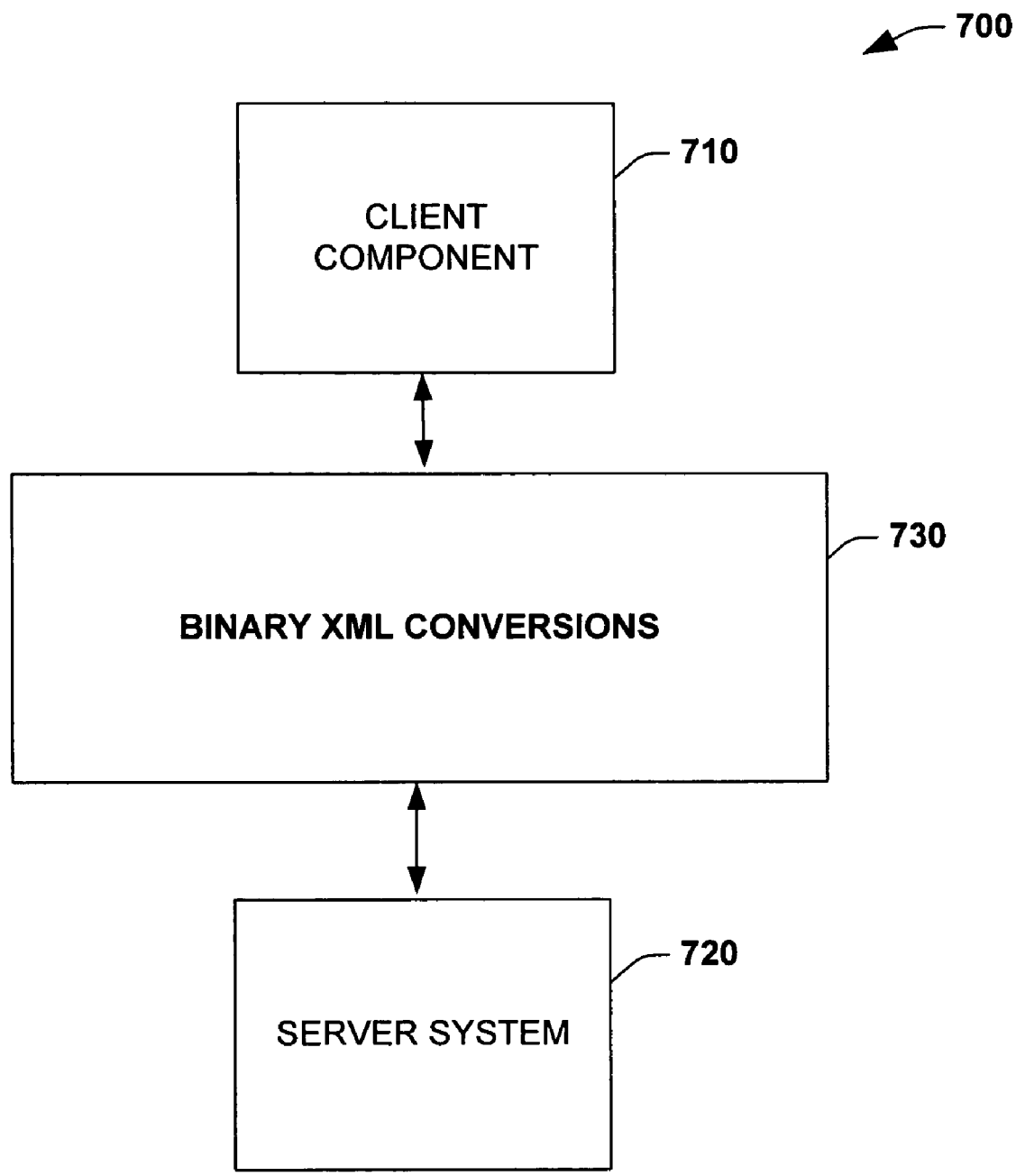
FIG. 7 illustrates an example system employing binary XML conversions for network communications in accordance with an aspect of the subject invention.

FIG. 7 illustrates an example system 700 employing binary XML conversions for network communications in accordance with an aspect of the subject invention. The system 700 includes a client component 710 that communicates with a server system 720 in accordance with a protocol 730 that utilizes binary XML representations for communicating and converting different data types between the client and server. In this aspect, the client application 710 communicates with the server 720 on its native protocol with no transformation required for the communication. When client(s) want to communicate with server(s) in XMLA format, it is effective to provide direct communication in XMLA. Thus, XMLA is a native format for the server 720 to communicate so this type of communication will have minimal overhead and maximum effectiveness. In addition, a user(s) can decide to use an application program interface(s) (APIs) to request and receive data from the server 720.

In the above case, the server 720 communicates with the client component 710, which provides a requested API to user's application. An example of one client component is OLEDB for OLAP provider or ADOMD.net provider. Using XMLA as a protocol to communicate with these components is convenient but not as effective as using a proprietary binary protocol. To solve this, and to continue using XMLA as a base protocol, Binary XML at 730 is used to minimize data transformation and the amount of data communicated between the client and server. In addition, an API is provided which allows use of internal server identificators of XMLA elements directly in Binary XML protocol and avoids additional transformation from server IDs to protocol IDs on the server and back from Protocol IDs to the server IDs on the client. Thus, the protocol 730 can include using Binary representation for XMLA to increase efficiency of XMLA protocol used as a native protocol for the server 720 when communicating between server and API provider. Further, the protocol provides an API to send and receive Binary XML with identificators used on the server. The following tables illustrate example mappings between systems that employ the protocol 730.

| Sql types | Token | Token Value | Binary | XSD String |
|---|---|---|---|---|
| Smallint | SQL_SMALLINT | 1 | 2 byte short | $-2^{15}$ to $2^{15}$ |
| Int | SQL_INT | 2 | 4 byte integer | $-2^{31}$ to $2^{31}$ |
| Real | SQL_REAL | 3 | 4 byte float(IEEE) | Fraction'E'Exponent |
| Float | SQL_FLOAT | 4 | 8 byte float(IEEE) | Fraction'E'Exponent |
| Money | SQL_MONEY | 5 | 8 byte long | Long/10000 string representation |
| Bit | SQL_BIT | 6 | Boolean | "1" \| "0" |
| Tinyint | SQL_TINYINT | 7 | Ubyte | '0'–'255' |
| Bigint | SQL_BIGINT | 8 | 8 byte integer | $-2^{63}$ to $2^{63}$ |
| uniqueident | SQL_UUID | 9 | byte+/*16 bytes*/ | Uuid string format |
| Decimal | SQL_DECIMAL | 10 | "len prec scale sign byte+" which is == "mb32 prec scale sign byte+", i.e. len represents the size of type data. | ('+'\|'–') Bias string'.'Fraction string |
| Numeric | SQL_NUMERIC | 11 | Same as SQL_DECIMAL | ('+'\|'–') Bias string'.'Fraction string |
| Binary | SQL_BINARY | 12 | Mb32 byte* | Base64 encoded string |
| Char | SQL_CHAR | 13 | mb32/* codePage len + byte len*/ codePage byte* | Unicode string |
| Nchar | SQL_NCHAR | 14 | mb32/*number of UTF16 characters*/char* | Unicode string |
| varbinary | SQL_VARBINARY | 15 | Mb64 byte* | Base64 encoded string |
| Varchar | SQL_VARCHAR | 16 | Mb64/* codePage len + byte len*/ codePage byte* | Unicode string |
| nvarchar | SQL_NVARCHAR | 17 | Mb64/*number of UTF16 characters*/char* | Unicode string |
| Datetime | SQL_DATETIME | 18 | dateticks timeticks | (–)?CCYY-MM-DDThh:mm:ss. (.sss)? |
| smalldatetime | SQL_SMALLDATETIME | 19 | sdateticks stimeticks | (–)?CCYY-MM-DDThh:mm:ss. (sss)? |
| smallmoney | SQL_SMALLMONEY | 20 | 4 byte int | Int/10000 string representation |
| timestamp | SQL_TIMESTAMP | 21 | 8 bytes | Base64 encoded string Note: This type is generally not used, but the token slot is kept to keep SQL Server's internal SQL_* tokens in sync with ORD_* enum in the server. |
| Text | SQL_TEXT | 22 | Mb64/* codePage len + byte len*/ codePage byte* | Unicode string |
| Image | SQL_IMAGE | 23 | Mb64 byte* | Base64 encoded string |
| Ntext | SQL_NTEXT | 24 | Mb64/*number of UTF 16 characters*/char* | Unicode string |
| Variant | Will persist as other types | 27 | Mb64 byte* | Base64 encoded string |
| Udt | SQL_UDT | | | |

| XSD types | Token | Token Value | Binary | XSD string |
|---|---|---|---|---|
| Boolean | XSD_BOOLEAN | 134 | boolean | 'true' \| 'false' |
| Time | XSD_TIME | 129 | 8 byte integer | hh:mm:ss(.sss)?(Z\|[+–]hh:ss)? |
| dateTime | XSD_DATETIME | 130 | 8 byte integer | (–)?CCYY-MM-DDThh:mm:ss (.sss)? (Z\|[+–]hh:ss)? |
| Date | XSD_DATE | 131 | 8 byte integer | (–)?CCYY-MM-DD(Z\|[+]hh:ss)? |
| Binhex | XSD_BINHEX | 132 | Mb64/ *number of bytes*/byte* | Binhex encoded unicode string |
| Base64 | XSD_BASE64 | 133 | Mb64/ *number of bytes*/byte* | Base64 encoded unicode string |
| Decimal | XSD_DECIMAL | 135 | Same as SQL_DECIMAL | ('+' \|'–') Bias string'.'Fraction string, we remove trailing zeros. |
| byte | XSD_BYTE | 136 | 1 byte integer | signed 8-bit integer. Values range: 128 to 127 |

-continued

| | | | | |
|---|---|---|---|---|
| unsignedShort | XSD_UNSIGNEDSHORT | 137 | 2 byte integer | unsigned 16-bit integer. |
| unsignedInt | XSD_UNSIGNEDINT | 138 | 4 byte integer | unsigned 32-bit integer. |
| unsignedLong | XSD_UNSIGNEDLONG | 139 | 8 byte integer | unsigned 64-bit integer. |
| QName | XSD_QNAME | 140 | qname - Mb32 encoded positive (starting from 1) unsigned integer | Prefix_string: local_name_string obtained after qname token resolution |

Figure 8:
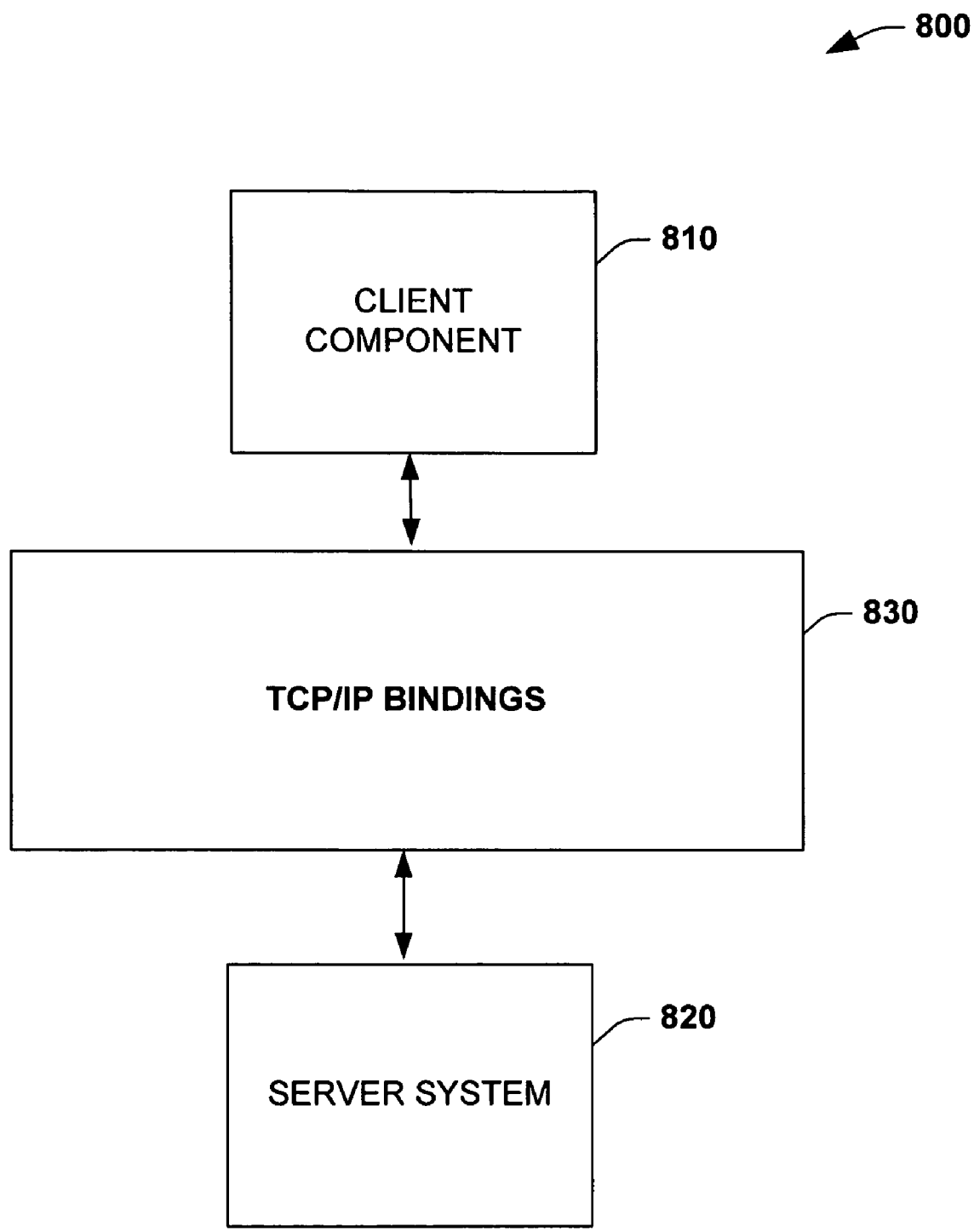
FIG. 8 illustrates an example network system for alternative network bindings in accordance with an aspect of the subject invention.

FIG. 8 illustrates an example network system 800 for alternative network bindings in accordance with an aspect of the subject invention. Similar to the systems described above with respect to FIGS. 5-7, the system 800 includes a client component 810 that communicates with a server system 820 in accordance with a protocol binding 830 that extends network capabilities beyond conventional HTTP bindings. In general, the XML for Analysis standard is based on SOAP (Simple Object Access Protocol), wherein conventional standards describe bindings to HTTP protocol. In one aspect, in addition to providing XMLA on top of HTTP, the subject invention also provides XMLA bindings to TCP/IP. Utilizing TCP/IP as a data transport mechanism, allows Analysis Services to support authentication protocols and compression algorithms beyond those supported by HTTP. In addition, this allows significant performance gains by bypassing the middle tier layer of a Web Server, for instance, and supports multi-instancing browsing services.

The TCP/IP bindings 830 include a protocol stack which is a set of network protocol layers that operate together. The XMLA protocol standard binding to HTTP protocol has a protocol stack illustrated in the following exemplary table:

| | |
|---|---|
| Application method calls | Discover, Execute |
| Data types | XML for Analysis |
| Protocol for method invocation | SOAP |
| Data encoding | XML |
| Security/Encryption | SSL |
| Compression | Gzip, compress |
| Message | HTTP |
| Network | TCP/IP |

The XMLA protocol of the subject invention, in addition to the Protocol Stack illustrated above, provides the protocol stack illustrated in the following exemplary table:

| | |
|---|---|
| Application method calls | Authenticate, Discover, Execute |
| Data types | XML for Analysis |
| Protocol for method invocation | SOAP |
| Data encoding | SX |
| Security/Encryption | SSPI |
| Compression | Compression Algorithm |
| Message | DIME |
| Network | TCP/IP |

The following describes some of the different layers supported by the subject invention and illustrated in the table above. Direct Internet Message Encapsulation (DIME) is a lightweight, binary message format that can be used to encapsulate one or more application-defined payloads of arbitrary type and size into a single message construct. Each payload can be described by a type, a length, and an optional identifier. Both URIs and MIME media type constructs are supported as type identifiers. DIME is an Internet standard used in conjunction with other layers to specify features of higher layers using DIME Types. For compression, substantially any type of data compression algorithm that uses a DIME Type application which is the actual stream that a payload compresses can be employed. However, it is to be appreciated that it is possible to support various types of compression algorithms. The present invention uses various DIME types including "text/xml" which is the basic XML with no compression and no SX encoding and which is standardized by the DIME standards. "Application/sx", which is no compression and SX encoding, may be used. Another type that may be used is "application/xml+compression" which is compression but no SX encoding, e.g., compressed XML. The type "application/sx+compression" which is both compression and SX encoding may also be used by the subject invention.

XMLA generally defines two SOAP method calls, Execute and Discover. The present invention adds another SOAP method call, Authenticate. The Authenticate method is used to perform authentication sequences between a client and server and supports authentication using SSPI. However, it is to be appreciated that it is possible to use other authentication schemes with the present invention. After SSPI context has been established, it is possible to use SSPI to achieve encryption and digital signatures. The layout of the message may appear like those depicted in the following table:

| SSPI header | [Encrypted] Payload | SSPI header | [Encrypted] payload |
|---|---|---|---|
| DIME Message | | | |
| DIME Record | | | |
| DIME Chunk | DIME Chunk | DIME Chunk | DIME Chunk |

Figure 9:
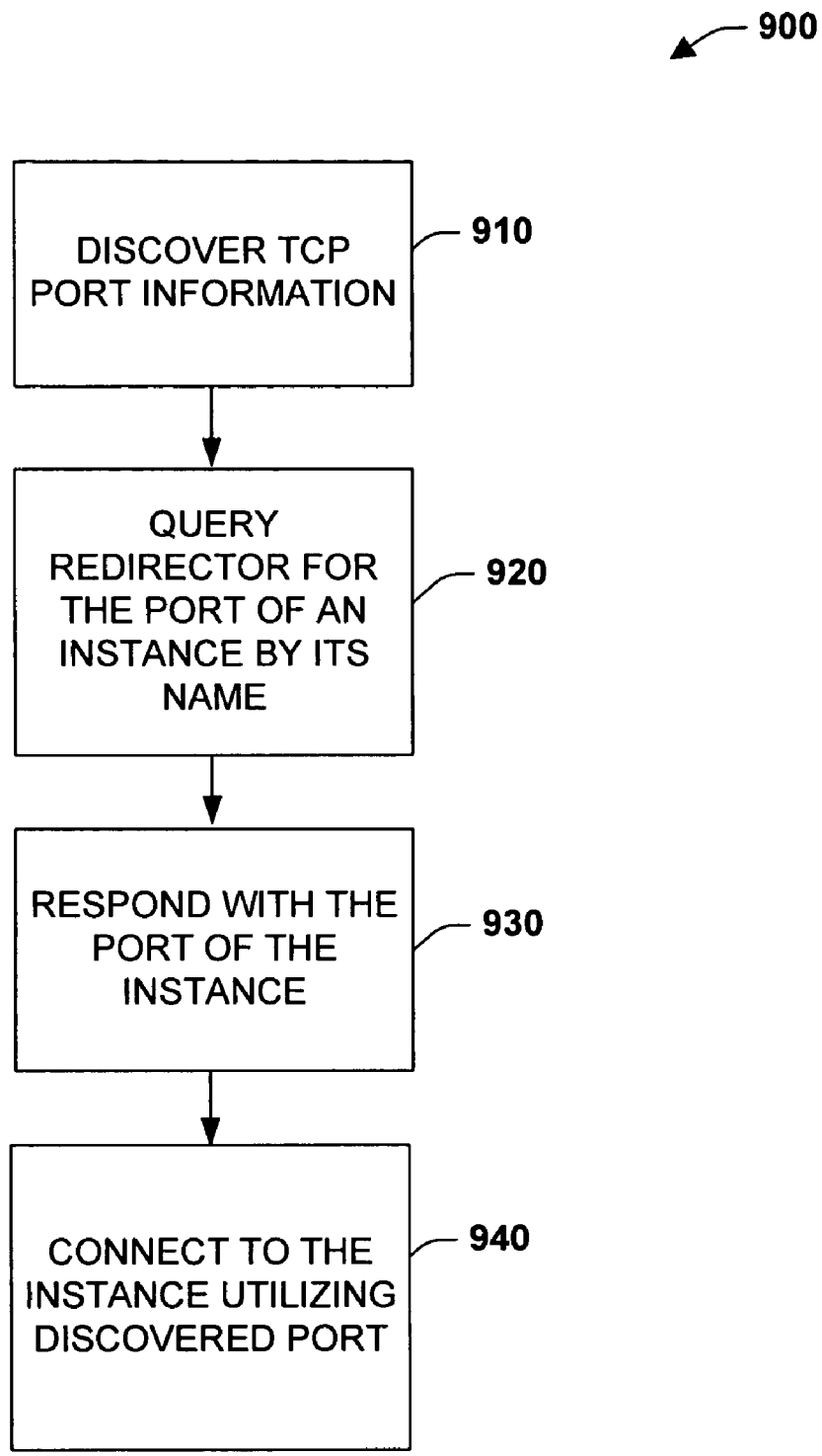
FIG. 9 is a flow chart illustrating an example protocol binding process in accordance with an aspect of the subject invention.

FIG. 9 illustrates a protocol binding process 900 for data interactions accordance with an aspect of the subject invention. While, for purposes of simplicity of explanation, the methodology is shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

The process 900 illustrates an example binding process between network ports on a computer (logical or physical).

Proceeding to 910, before communications can commence between systems, information regarding the destination system is discovered in order to establish a connection between communicating peers. Thus, in order to establish a TCP connection, the TCP port must be known. In the case of multiple port instances running on the same machine, each instance should use another or different port. Analysis Services generally resolves multiple instances by running a service called "redirector" on a well known port (e.g., port 80). Redirector supports XMLA and XMLA bindings to TCP/IP as described above with respect to FIG. 8. The Redirector can also answer at least one XMLA method call—e.g., Discover, and at least one type of Discover Instance. The result is row set, which includes a mapping between instances of Analysis Services running on the machine and their ports. Some of the acts that encompass the above described communications between machines may include at 920 where a Client machine requests the redirector for the port of the instance by its name. At 930, the Redirector responds with the port of the instance by communicating back to the client over a network. Upon receiving the information, the Client connects to the instance using the discovered port information at 940.

Figure 10:
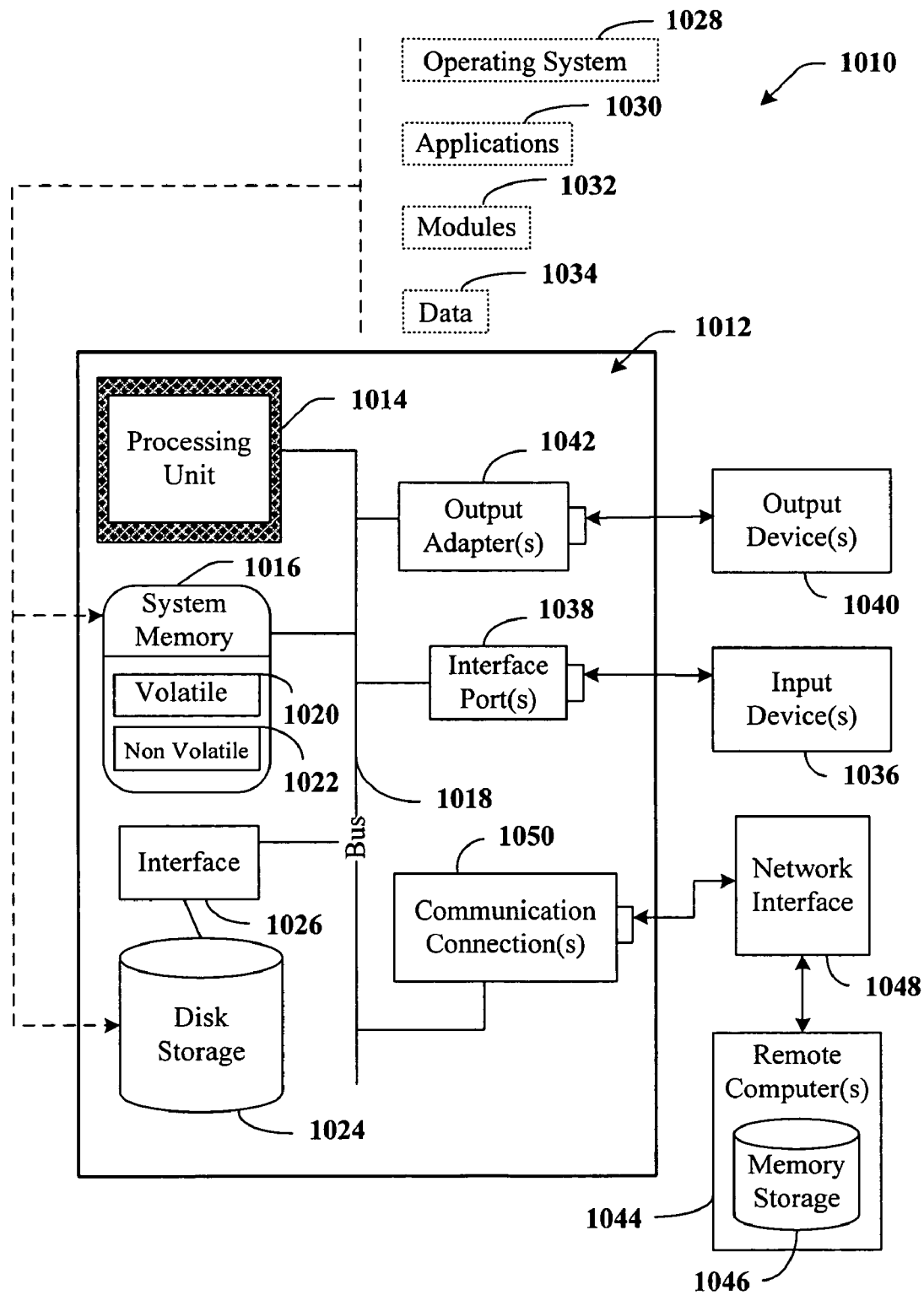
FIG. 10 is a schematic block diagram illustrating a suitable operating environment in accordance with an aspect of the subject invention.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
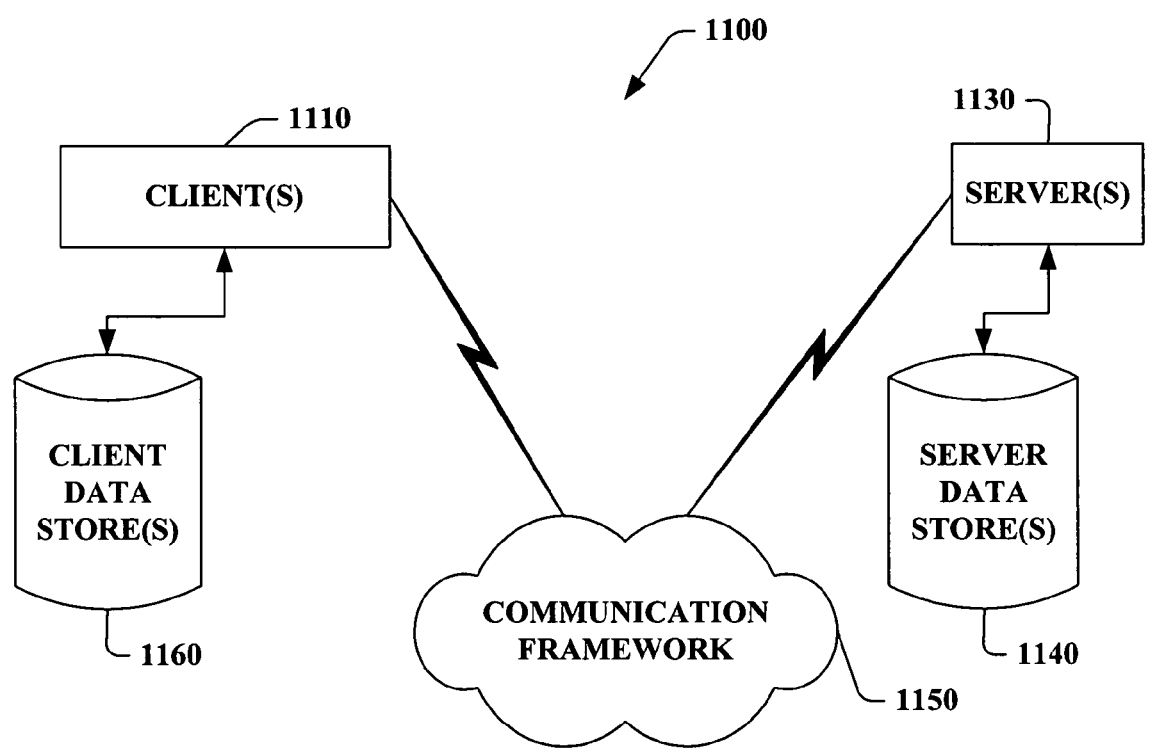
FIG. 11 is a schematic block diagram of a sample-computing environment with which the subject invention can interact.

FIG. 11 is a schematic block diagram of a sample-computing environment 1100 with which the subject invention can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the subject invention, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A network data transfer system comprising a memory having stored therein computer executable components and a processor that executes the computer executable components, wherein the computer executable components include:
    an Extensible Markup Language for Analysis (XMLA) protocol component that employs a computerized mark-up language to facilitate data interactions between network components, wherein the data interactions are based on, at least in part; (1) of an execute method having a statement command, (2) a discover method having at least one discover, and (3) at least one property of the mark-up language; and
    an XMLA extension component that operates with the protocol component to support the data interactions, wherein the extension component:
    (1) extends the statement method by utilizing the statement command to supply at least one other command to facilitate the data interactions, and wherein the at least one other command comprises at least one of a create command, an alter command, or a delete command;
    (2) extends the discover method by supplying at least one other discover type for discovering the state of objects on a server;
    (3) supplies at least one other property to further extend server object management capabilities;
    (4) supplies a parameter specification component that enables the statement command to be parameterized, and that enables one or more parameters to be sent with the at least one other command; and
    (5) supplies a binary markup-language extension for communications that facilitates communications between client and server components using a binary representation of the markup-language and that includes an interface enabling use of internal server identifiers of markup language elements directly in the binary representation.

2. The system of claim 1, wherein the at least one other command further comprises at least one of a process command, a lock command, an unlock command, a begin transaction command, a commit transaction command, a rollback transaction command, a batch command, a subscribe command, a design aggregations command, a cancel command, a backup command, a restore command, a parallel command, a notify table changes command, a merge partitions command, or a synchronize command.

3. The system of claim 1, wherein the XMLA extension component further comprises a row set component for the statement command.

4. The system of claim 1, further comprising a protocol binding extension layer that enables binding XMLA directly to a TCP/IP network protocol during the data interactions.

5. The system of claim 4, wherein the protocol binding extension layer is associated with a protocol stack specifying at least one compression component.

6. The system of claim 5, wherein the protocol stack is associated with a Direct Internet Message Encapsulation (DIME) protocol.

7. The system of claim 6, wherein the compression component is adapted to the DIME protocol.

8. The system of claim 5, wherein the protocol stack is associated with Security Support Provider Interface (SSPI) algorithm.

9. The system of claim 1, further comprising a service that operates at least one of a configuration class to operate a dialog session or an activity class to operate the dialog session.

10. The system of claim 1, wherein the XMLA extension component further comprises an object description that is followed to facilitate network communications between components.

11. The system of claim 10, wherein the object description is related to at least one of the following objects: a Server; a Database; a Dimension; a Cube; a MeasureGoup; a Partition; a Perspective; an AggregationDesign; a MiningStructure; a MiningModel; a DataSource; a DataSourceView; a Trace; an Assembly; an MdxScript; a Role; a DatabasePermission; a DimensionPermission; a CubePermission; a MiningStructurePermission; a MiningModelPermission; or a DataSourcePermission object.

12. A method for extending an Extensible Markup Language for Analysis (XMLA) base protocol to communicate network data between network systems, comprising:
    employing an XMLA base protocol to communicate between network systems;
    extending at least: (1) a statement command of an execute method of the XMLA base protocol, (2) a discover method of the XMLA base protocol, and (3) a property of the XMLA base protocol;
    defining at least one protocol extension for the XMLA base protocol, wherein the at least one protocol extension comprises: (1) expanding the statement command of the execute method to include at least one other command to facilitate data interactions, and wherein the at least one other command comprises at least one of a create command, an alter command, or a delete command, (2) expanding the discover method to include at least one new discovery type, and (3) expanding the property to include at least one new property;
    adding a parameter specification component to the extension protocol, enabling the statement command to be parameterized and enabling one or more parameters to be sent with the other command;

adding a binary mapping component that facilitates communications between client and server components using a binary representation of the XMLA base protocol, and that includes an interface enabling use of internal server identifiers of XMLA base protocol elements directly in the binary representation; and automatically communicating data between the network systems in the binary representation of the XMLA base protocol and based on, at least in part, the statement command of the execute method using at least one parameter, the discover method, and the property.

13. The method of claim 12, wherein the parameter specification includes at least a row set specification.

14. The method of claim 12, further comprising adding a binding extension layer to the at least one protocol extension.

15. The system of claim 4, wherein the protocol binding extension layer comprises an Authenticate method that performs authentication sequences between a client and server, and wherein the Authenticate method supports authentication utilizing a Security Support Provider Interface (SSPI).

16. The system of claim 1, wherein the mark-up language comprises XMLA and Wireless Markup Language (WML).

17. The system of claim 1, wherein the at least one other discover type is a discover Extensible Markup Language (XML) metadata type.

18. The system of claim 1, wherein the at least one other property further comprises at least one of an impact analysis property or an execution mode property.

19. The system of claim 1, wherein the parameter specification component enabling the statement command to be parameterized and enabling one or more parameters to be sent with the other command further comprises including a name reference to each of the one or more parameters within the statement command, and adding each of the one or more parameters within a parameter argument of the execute method as name and value pairs.

* * * * *